US012589626B1

(12) United States Patent
Bronoski

(10) Patent No.: US 12,589,626 B1
(45) Date of Patent: Mar. 31, 2026

(54) AIR SPRING PRESSURE MONITORING SYSTEM

(71) Applicant: ContiTech Deutschland GmbH, Hannover (DE)

(72) Inventor: Steveson Juliano Bronoski, Copley, OH (US)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 18/934,855

(22) Filed: Nov. 1, 2024

(51) Int. Cl.
| | |
|---|---|
| *B60G 17/019* | (2006.01) |
| *B60G 11/27* | (2006.01) |
| *B60G 17/015* | (2006.01) |
| *B60G 17/0165* | (2006.01) |
| *B60G 17/033* | (2006.01) |
| *B60G 17/052* | (2006.01) |

(52) U.S. Cl.
CPC ........ *B60G 17/01908* (2013.01); *B60G 11/27* (2013.01); *B60G 17/0155* (2013.01); *B60G 17/0165* (2013.01); *B60G 17/033* (2013.01); *B60G 17/0521* (2013.01); *B60G 2202/152* (2013.01); *B60G 2204/62* (2013.01); *B60G 2206/42* (2013.01); *B60G 2206/73* (2013.01); *B60G 2400/102* (2013.01); *B60G 2400/51222* (2013.01); *B60G 2400/7122* (2013.01); *B60G 2500/201* (2013.01); *B60G 2600/182* (2013.01); *B60G 2800/162* (2013.01); *B60G 2800/916* (2013.01)

(58) Field of Classification Search
CPC .............. B60G 17/01908; B60G 11/27; B60G 17/0155; B60G 17/0165; B60G 17/033; B60G 17/0521
See application file for complete search history.

(56) References Cited

U.S. PATENT DOCUMENTS

| | | | | |
|---|---|---|---|---|
| 4,700,968 | A * | 10/1987 | Cherry ................... | B62D 61/12 |
| | | | | 180/290 |
| 7,261,303 | B2 * | 8/2007 | Stefan .............. | B60G 17/01908 |
| | | | | 280/755 |
| 8,899,603 | B2 * | 12/2014 | VanRaaphorst ......... | F16F 9/057 |
| | | | | 267/64.23 |
| 9,879,745 | B2 * | 1/2018 | Prams .................... | B60G 11/27 |
| 2002/0038193 | A1 * | 3/2002 | Grunberg .............. | G01G 19/08 |
| | | | | 701/37 |
| 2006/0267297 | A1 * | 11/2006 | Nordmeyer ............ | B60G 11/27 |
| | | | | 280/124.16 |
| 2022/0134830 | A1 * | 5/2022 | Voelkel ................. | F16F 9/3292 |
| | | | | 188/313 |

FOREIGN PATENT DOCUMENTS

| | | | | |
|---|---|---|---|---|
| JP | 2005300533 | A * | 10/2005 | ......... B60G 17/0155 |

* cited by examiner

*Primary Examiner* — Faye M Fleming
(74) *Attorney, Agent, or Firm* — Lippes Mathias LLP

(57) ABSTRACT
The present invention discloses an air springs monitoring system for a transport vehicle having multiple air springs, air spring sensors for measuring interior air spring pressure, a communication module for gathering measurement data from the sensors, and a base station for deriving suspension outputs based on the collected data. The system enables real-time monitoring and analysis of air spring conditions, facilitating suspension performance and vehicle safety.

15 Claims, 3 Drawing Sheets

*100*

Air Spring *200*

AIR SPRING PRESSURE MONITORING SYSTEM

FIELD

The field to which the disclosure relates is air springs.

BACKGROUND

Air springs are standard components used in suspension systems for rail and vehicle transportation. Air sprigs employ compressed air to absorb and cushion loads. They typically provide a smoother ride compared with all metal springs.

However, air springs can degrade or fail over time. Such failures can impact load and transport vehicles.

What is needed are one or more techniques to monitor air springs over time.

DETAILED DESCRIPTION

Figure 1:
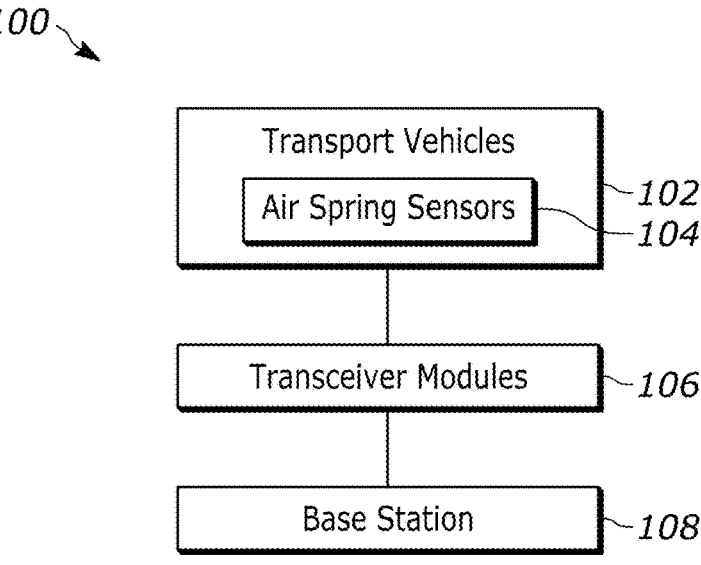
FIG. 1 is a system 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, with the understanding that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Air springs are components used in suspension systems for rail and vehicle transportation. Air springs employ compressed air to absorb and cushion loads. They typically provide a smoother ride compared with all metal springs. However, air springs can degrade over time.

It is appreciated that air springs can fail or degrade over time. For example, associated compressors can fail, air leaks can develop, and the like. This can lead to loading issues, vehicle frame damage, and the like.

What is needed are one or more techniques to monitor air springs for rail and vehicle transportation.

In some aspects, the techniques described herein relate to an air springs monitoring system including: a plurality of air springs for a vehicle suspension; a plurality of air spring sensors that measure interior air spring pressure of the plurality of air springs as measurement data; a communication module to collect the measurement data from the plurality of air spring sensors; and a base station to derive one or more suspension outputs from the collected measurement data.

In some aspects, the techniques described herein relate to a system, wherein the one or more suspension outputs include frequency of the measurement data.

In some aspects, the techniques described herein relate to a system, wherein the one or more suspension outputs include temperature.

In some aspects, the techniques described herein relate to a system, wherein the air spring sensors further measure an air temperature of interior air and/or a plate temperature of the plurality of air springs.

In some aspects, the techniques described herein relate to a system, wherein the air spring sensors further measure acceleration.

In some aspects, the techniques described herein relate to a system, wherein the plurality of air springs each include a mount plate, a bottom plate, an elastomer assembly connecting the mount plate and the bottom plate, and a sensor of the plurality of air spring sensors attached to the bottom plate.

In some aspects, the techniques described herein relate to a system, wherein the base station includes: a transceiver; a sensor interface coupled to the plurality of sensors or the communication module; a storage to store the collected measurement data; and one or more processors configured to determine a load based on the collected measurement data.

In some aspects, the techniques described herein relate to a system, wherein the one or more processors are configured to select damping or vibration absorption and adjust the pressure of the plurality of air springs based on the selected damping.

In some aspects, the techniques described herein relate to an air spring monitoring system including: a mount plate to mount to a vehicle suspension system; a bottom plate to attach to an axle; an elastomer assembly connecting coupled to the mount plate and the bottom plate and holds a volume of air at an interior pressure; a valve operable by a solenoid to adjust the interior air pressure; a sensor attached to the bottom plate configured to measure the interior air pressure as measurement data; and one or more processors configured to generate one or more suspension outputs from the measurement data.

In some aspects, the techniques described herein relate to a system, wherein the one or more suspension outputs include frequency of the measurement data.

In some aspects, the techniques described herein relate to a system, wherein the one or more suspension outputs include temperature.

In some aspects, the techniques described herein relate to a system, wherein the sensor further measure an air temperature of interior air and/or a plate temperature of the plurality of air springs.

In some aspects, the techniques described herein relate to a system, further including an air compressor coupled to the valve.

In some aspects, the techniques described herein relate to a system, further includes a transceiver coupled to the one or more processors.

In some aspects, the techniques described herein relate to a method of operating an air spring monitoring system, the method including: measuring pressures for a plurality of air springs by a plurality of air spring sensors as measurement data; determining frequencies for the air springs based on the measurement data; determining low and high pressure variations for the air springs based on the measurement data; and determining loading of a suspension based on the determined frequencies and the determined pressure variations.

In some aspects, the techniques described herein relate to a method, further including measuring temperature within the air springs.

In some aspects, the techniques described herein relate to a method, further including adjusting internal air pressure of one or more of the plurality air spring sensors based on the measurement data.

FIG. 1 is a diagram illustrating an air springs monitoring system 100 in accordance with one or more embodiments. The system is provided for illustrative purposes and suitable variations are contemplated.

The system 100 includes air spring sensors 104, transceiver modules 106 and a base station 108. The system 100 generates measurement data and monitors the air spring sensors 104 from a number of transport vehicles 102.

The air spring sensors 104 measure one or more of pressure, temperature, acceleration and the like. In one example, the sensors 104 measure air pressure within an air spring chamber.

The sensors 104 utilize a suitable pressure measuring technology, such as piezoelectric, capacitive, resistive, optical, piezoresistive and the like. The sensors 104 can include sensor transceivers to wirelessly provide or send the measurement data using a wireless technology such as WiFi, Bluetooth, cellular networks, near field communications (NFC), Zigbee, and the like.

The sensors 104 can also utilize a suitable temperature measuring technology, such as thermocouples, resistance temperature detectors (RTDs), thermistors, and the like. The sensor 104 can measure temperature of air within the air springs, plate temperatures, and/or an elastomer assembly.

The sensors 104 can be powered using battery power, wired power, or a vibration based energy harvesting. For example, a piezoelectric material can be incorporated into the sensors 104. The piezoelectric material generates electrical energy in response to vibration of the sensors 104.

In one example, there are one or more of the sensors 104 for each air spring in a vehicle suspension system.

The transceiver modules 106 collect information from the sensors 104. The transceiver modules 106 typically collect information for a vehicle, tractor-trailer, freight car and the like. The transceiver modules 106 are also referred to as communication modules.

In one example, a tractor-trailer has a transceiver module that collects the measurement data for one or more air springs of a trailer suspension system.

The base station 108 receives the measurement data from the sensors 104 and/or the transceiver modules 106 and generates and/or derives one or more suspension outputs. The base station 108 can also be referred to as a controller, control unit, and/or central control unit.

The base station 108 can be located external to the sensors 104. For example, the base station 108 can be located with a trailer, a tractor, freight car and the like.

The suspension outputs can include frequency of the measurement data, pressure variations, and the like.

The suspension outputs can include temperature, suspension load, weight, mass and the like.

In another example, the base station 108 uses artificial intelligence to analyze the measurement data and generate the suspension outputs.

Figure 2:
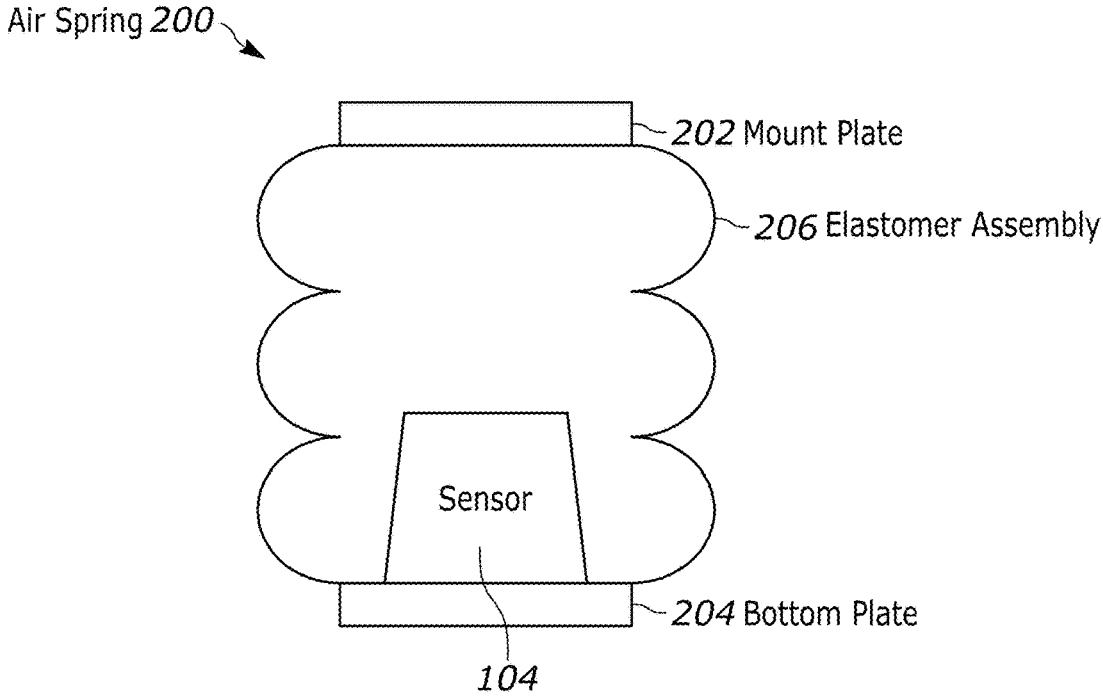
FIG. 2 is a diagram illustrating an air spring 200 with an air spring sensor 104 in accordance with one or more embodiments.

FIG. 2 is a diagram illustrating an air spring 200 with an air spring sensor 104 in accordance with one or more embodiments. It is appreciated that suitable variations of the air spring 200 are contemplated.

The air spring 200 includes an upper plate or mount plate 202, an elastomer assembly or bag 206, a lower or bottom plate 204 and one or more of the air spring sensors 104.

The air spring 200 is inflated by compressed air and acts as a cushion between a vehicle and its axle. The pressure of the air spring 200 can be adjusted based on load requirements and the like.

The sensor 104 is mounted in an interior of the air spring, such as the bottom plate 204 and/or the upper plate 202.

The sensor 104 generates the measurement data, which includes measured pressure of the interior of the air spring 200. The sensor 104 can measure other data including, but not limited to, temperature, humidity, acceleration, force, vibrations, and noise. The sensor 104 provides the measurement data for further processing or analysis, as described above.

Figure 3:
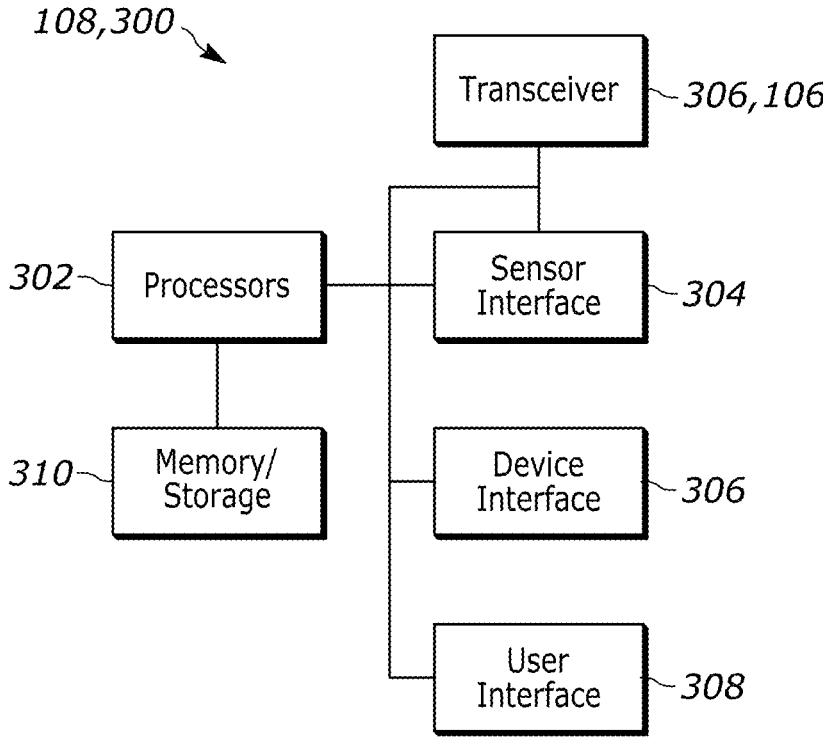
FIG. 3 is a diagram illustrating a base station 300, 108 in accordance with one or more embodiments.

FIG. 3 is a diagram illustrating a base station 300, 108 in accordance with one or more embodiments. The base station 300 is provided for illustrative purposes and it is appreciated that suitable variations are contemplated.

The base station 300 includes one or more processors 302, a sensor interface 304, a transceiver 306, a device interface 306, a user interface 308 and a memory 310.

The transceiver 306 receives the measurement data from the sensors 104 and/or the transceiver modules 106.

The one or more processors execution instruction(s) to analyze the measurement data and generates and/or derive one or more suspension outputs.

The suspension outputs can include frequency of the measurement data, pressure variations, and the like.

The suspension outputs can include temperature, suspension load, weight, mass and the like.

In another example, the base station 300 uses artificial intelligence to analyze the measurement data and generate the suspension outputs.

The one or more processors 302 can provide the suspension outputs to the user interface 308.

Figure 4:
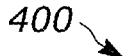
FIG. 4 is a flowchart of an example method 400 of operating an air spring monitoring system.
Figure 4:
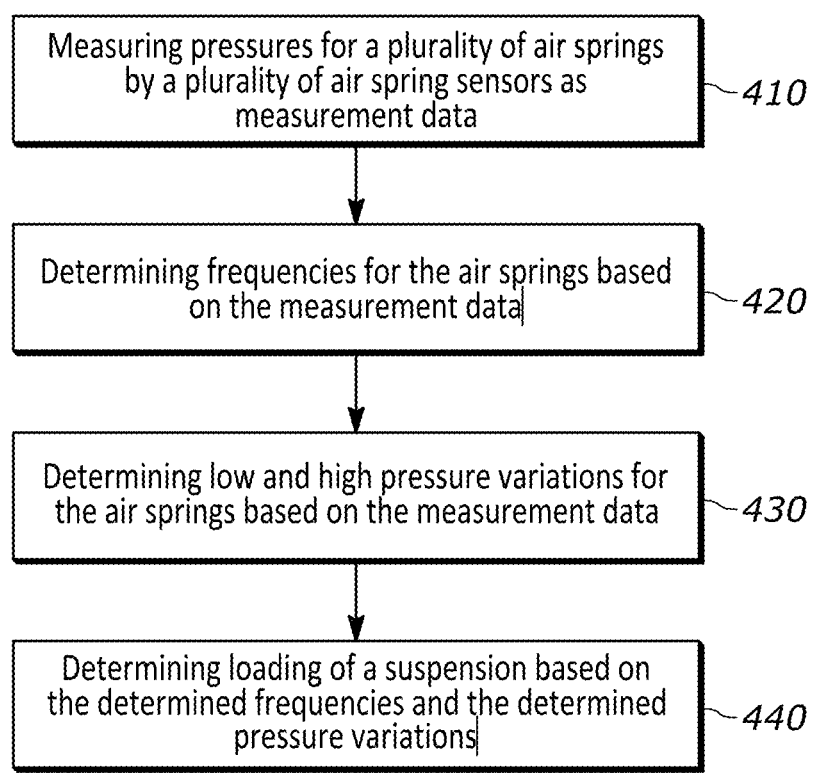

FIG. 4 is a flowchart of an example method 400 of operating an air spring monitoring system.

It is appreciated that suitable variations of the method 400 are contemplated, including but not limited to the presented order.

The method 400 can be performed in conjunction with the above systems and suitable variations thereof.

At step 410, measuring pressures for a plurality of air springs by a plurality of air spring sensors as measurement data.

At step 420, determining frequencies for the air springs based on the measurement data.

At step 430, determining low and high pressure variations for the air springs based on the measurement data.

At step 440, determining loading of a suspension based on the determined frequencies and the determined pressure variations.

The foregoing description of the embodiments has been provided for purposes of illustration and description. Example embodiments are provided so that this disclosure will be sufficiently thorough and will convey the scope to those who are skilled in the art. Numerous specific details are set forth such as examples of specific components, devices, and methods, to provide a thorough understanding of embodiments of the disclosure but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, component, region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Clause 1. An air springs monitoring system comprising: a plurality of air springs for a vehicle suspension; a plurality of air spring sensors that measure interior air spring pressure of the plurality of air springs as measurement data; a communication module to collect the measurement data from the plurality of air spring sensors; and a base station to derive one or more suspension outputs from the collected measurement data.

Clause 2. The system of clause 1, wherein the one or more suspension outputs include frequency of the measurement data.

Clause 3. The system of clause 2, wherein the one or more suspension outputs include temperature.

Clause 4. The system of any one of clauses 1-3, wherein the air spring sensors further measure an air temperature of interior air and/or a plate temperature of the plurality of air springs.

Clause 5. The system of any one of clauses 1-4, wherein the air spring sensors further measure acceleration.

Clause 6. The system of any one of clauses 1-5, wherein the plurality of air springs each comprise a mount plate, a bottom plate, an elastomer assembly connecting the mount plate and the bottom plate, and a sensor of the plurality of air spring sensors attached to the bottom plate.

Clause 7. The system of any one of clauses 1-6, wherein the base station comprises: a transceiver; a sensor interface coupled to the plurality of sensors or the communication module; a storage to store the collected measurement data; and one or more processors configured to determine a load based on the collected measurement data.

Clause 8. The system of clause 7, wherein the one or more processors are configured to select damping or vibration absorption and adjust the pressure of the plurality of air springs based on the selected damping.

Clause 9. An air spring monitoring system comprising: a mount plate to mount to a vehicle suspension system; a bottom plate to attach to an axle; an elastomer assembly connecting coupled to the mount plate and the bottom plate and holds a volume of air at an interior pressure; a valve operable by a solenoid to adjust the interior air pressure; a sensor attached to the bottom plate configured to measure the interior air pressure as measurement data; and one or more processors configured to generate one or more suspension outputs from the measurement data.

Clause 10. The system of clause 9, wherein the one or more suspension outputs include frequency of the measurement data.

Clause 11. The system of any one of clauses 9-10, wherein the one or more suspension outputs include temperature.

Clause 12. The system of any one of clauses 9-11, wherein the sensor further measure an air temperature of interior air and/or a plate temperature of the plurality of air springs.

Clause 13. The system of any one of clauses 9-12, further comprising an air compressor coupled to the valve.

Clause 14. The system of any one of clauses 9-13, further comprises a transceiver coupled to the one or more processors.

Clause 15. A method of operating an air spring monitoring system, the method comprising: measuring pressures for a plurality of air springs by a plurality of air spring sensors as measurement data; determining frequencies for the air springs based on the measurement data; determining low and high pressure variations for the air springs based on the measurement data; and determining loading of a suspension based on the determined frequencies and the determined pressure variations.

Clause 16. The method of clause 15, further comprising measuring temperature within the air springs.

Clause 17. The method of any one of clauses 15-16, further comprising adjusting internal air pressure of one or more of the plurality air spring sensors based on the measurement data.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An air springs monitoring system comprising:
a plurality of air springs for a vehicle suspension;
a plurality of air spring sensors that measure interior air spring pressure of the plurality of air springs as measurement data;
a communication module to collect the measurement data from the plurality of air spring sensors;
a base station to derive one or more suspension outputs from the collected measurement data; and
wherein the one or more suspension outputs include frequency of the measurement data.

2. The system of claim 1, wherein the one or more suspension outputs include temperature.

3. The system of claim 1, wherein the air spring sensors further measure an air temperature of interior air and/or a plate temperature of the plurality of air springs.

4. The system of claim 1, wherein the air spring sensors further measure acceleration.

5. The system of claim 1, wherein the plurality of air springs each comprise a mount plate, a bottom plate, an elastomer assembly connecting the mount plate and the bottom plate, and a sensor of the plurality of air spring sensors attached to the bottom plate.

6. The system of claim 1, wherein the base station comprises:
a transceiver;
a sensor interface coupled to the plurality of sensors or the communication module;
a storage to store the collected measurement data; and
one or more processors configured to determine a load based on the collected measurement data.

7. The system of claim 6, wherein the one or more processors are configured to select damping or vibration absorption and adjust the pressure of the plurality of air springs based on the selected damping.

8. An air spring monitoring system comprising:
a mount plate to mount to a vehicle suspension system;
a bottom plate to attach to an axle;
an elastomer assembly connecting coupled to the mount plate and the bottom plate and holds a volume of air at an interior pressure;
a valve operable by a solenoid to adjust the interior air pressure;
a sensor attached to the bottom plate configured to measure the interior air pressure as measurement data;
one or more processors configured to generate one or more suspension outputs from the measurement data;
wherein the or more suspension outputs include frequency of the measurement data.

9. The system of claim 8, wherein the one or more suspension outputs include temperature.

10. The system of claim 8, wherein the sensor further measures an air temperature of interior air and/or a plate temperature of the plurality of air springs.

11. The system of claim 8, further comprising an air compressor coupled to the valve.

12. The system of claim 8, further comprises a transceiver coupled to the one or more processors.

13. A method of operating an air spring monitoring system, the method comprising:
measuring pressures for a plurality of air springs by a plurality of air spring sensors as measurement data;
determining frequencies for the air springs based on the measurement data;
determining low and high pressure variations for the air springs based on the measurement data; and
determining loading of a suspension based on the determined frequencies and the determined pressure variations.

14. The method of claim 13, further comprising measuring temperature within the air springs.

15. The method of claim 13, further comprising adjusting internal air pressure of one or more of the plurality air spring sensors based on the measurement data.

* * * * *